CONSTANT AMPLIFICATION SUMMING AMPLIFIER
VOLTAGE CONTROL CIRCUIT

Filed July 17, 1968 4 Sheets-Sheet 1

Jan. 26, 1971 D. F. TRIGG 3,559,041

CONSTANT AMPLIFICATION SUMMING AMPLIFIER VOLTAGE CONTROL CIRCUIT

Filed July 17, 1968 4 Sheets-Sheet 3

3,559,041

CONSTANT AMPLIFICATION SUMMING AMPLIFIER VOLTAGE CONTROL CIRCUIT

Douglas F. Trigg, Ottawa, Ontario, Canada, assignor to Canadian Patents and Development Limited, Ottawa, Ontario, Canada, a corporation of Canada Filed July 17, 1968, Ser. No. 745,558
Int. Cl. G05f *1/10*
U.S. Cl. 323—100 5 Claims

ABSTRACT OF THE DISCLOSURE

A circuit for preventing a variable voltage from exceeding predetermined limits by adding a step voltage level change to the variable voltage thus maintaining the sum of the variable voltage and the added step within the predetermined range. The addition occurs in a summing amplifier to which outputs from a counting circuit preferably consisting of a string of bistable multivibrators and the variable voltage are applied as inputs.

Figure 1:
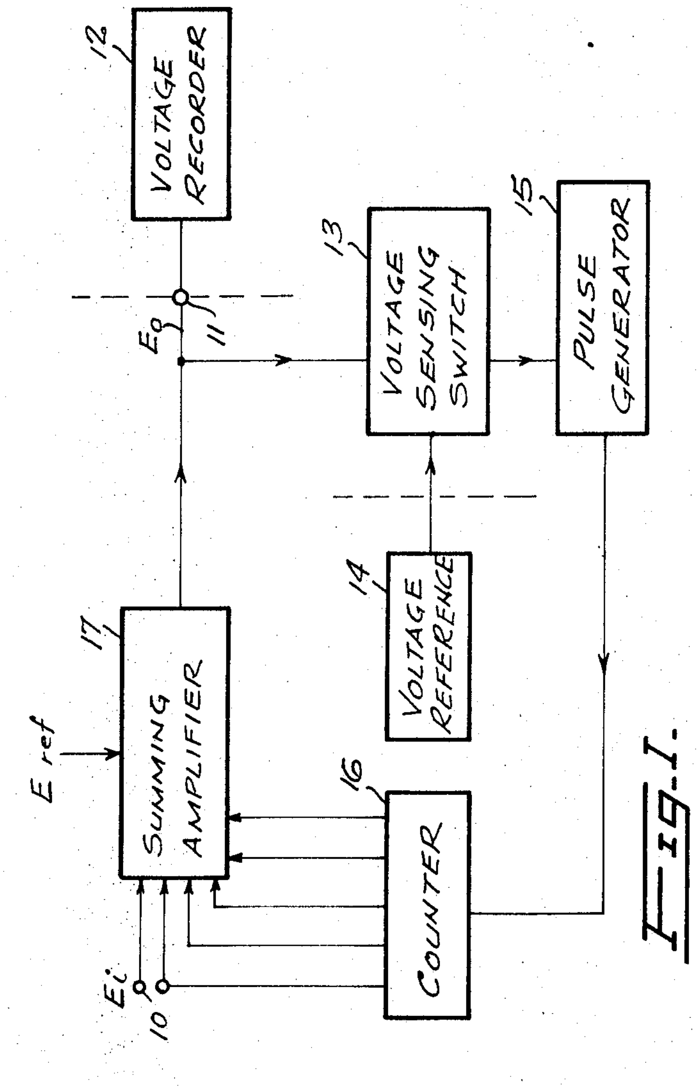

The present invention relates to a voltage control circuit and in particular a voltage control circuit for maintaining the level of a variable voltage within a predetermined range by adding discrete voltage level changes to the variable voltage.

During the recording of variable voltage outputs such as the voltage output from a station magnetometer, a wide range of voltage values may be encountered. Frequently, a magnetometer voltage output will fluctuate over a very large range and at the same time a fine grained fluctuation of the magnetometer output will occur. With conventional recording equipment, limit switches have been used which are tripped by the recorder when the voltage level reaches the full scale value of the recorder. The limit switch then reduces the sensitivity of the recorder or inserts a single step of voltage into the recorder input in order to bring the input back within the range of the recorder. With such equipment, the reduced sensitvity of the recorder when range changing occurs results in the loss of much of the fine grain detail of the record which is essential for the proper interpretation of the data. Additionally, during severe magnetic storms or under like data input conditions to a voltage recorder, the range of values of the input may vary widely. If a single step is inserted in the input voltage, the instrument may again reach the upper limit of its recording range and all data is then lost. It is not desirable to reduce the sensitivity of the recorder since important changes of a small magnitude may be lost. A single step placed in the input is adequate only if the range of the recorder is not exceeded a second time. Additionally, many types of recorders may not readily be fitted with limit switches and it is impossible to accommodate a wide dynamic range in the recorded data using the techniques of the prior art.

In contrast, the present invention provides an electronic voltage control circuit which requires no extra connections to the recorder and may be inserted directly in circuit between the source of voltage data and the voltage recorder and will maintain the voltage from a source of voltage data within the predetermined range by adding discrete voltage level changes to the output from the voltage data source. In accordance with the invention, such a voltage control circuit comprises an electronic voltage level sensing switch or circuit having its input connected to the output of a summing amplifier. The switch gates the output of a pulse generator to a counter. The output of the counter is fed to the input of a summing amplifier together with the variable voltage to be recorded. The output of the summing amplifier is maintained within the predetermined range by discrete voltage level inputs from the counter which voltage increments are controlled by the operation of the voltage sensing switch. Thus, the dynamic range of the input to the recorder is not impaired and at the same time the full fine grain data is also preserved since no sensitivity changing is required.

Thus, the present invention provides an electronic voltage sensing device to determine when the input to the recording system has exceeded allowable limits and then operates to bring this input back within the proper range. By the proper choice of components, the circuit may perform this function as many times as is desired by the designer.

Figure 2:
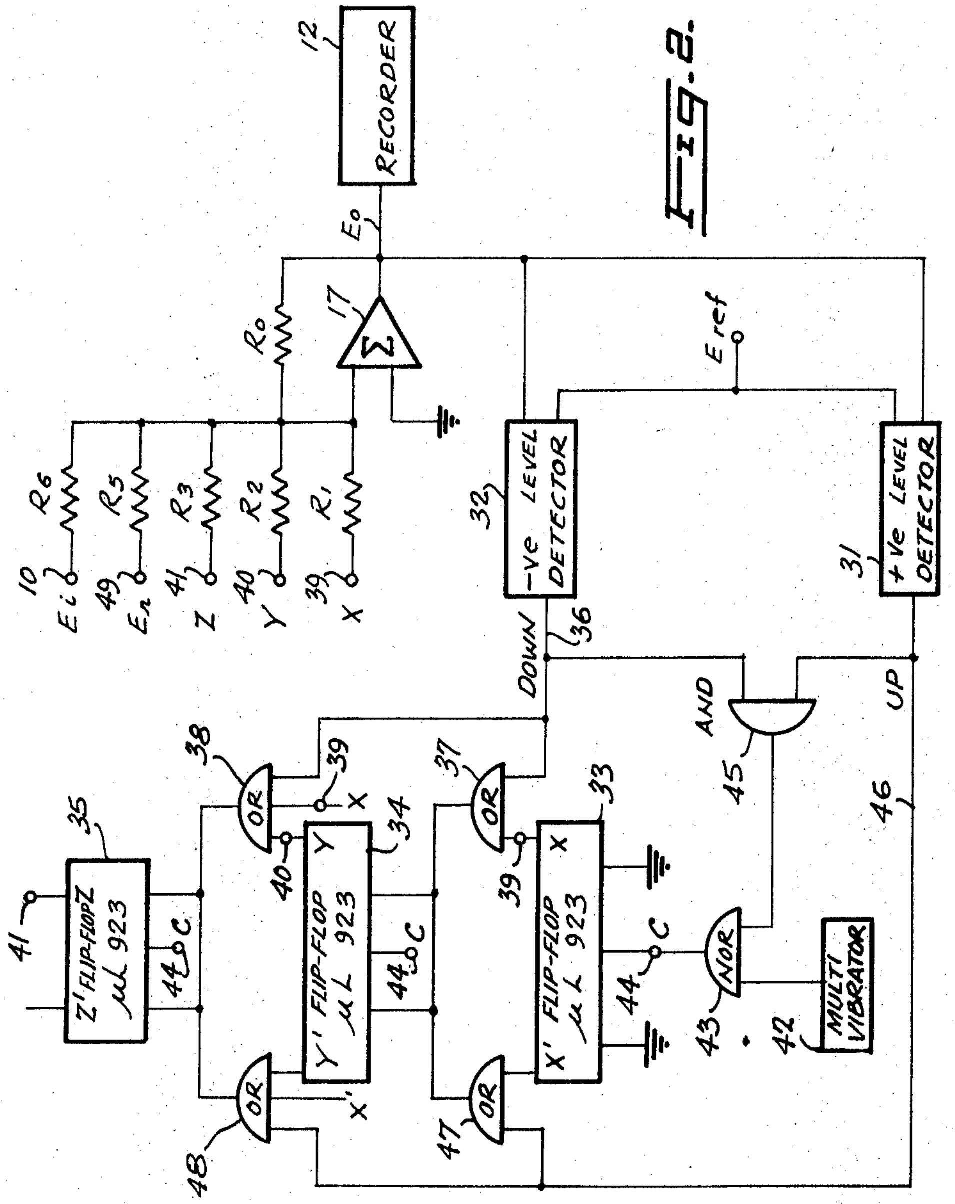
Figure 3:
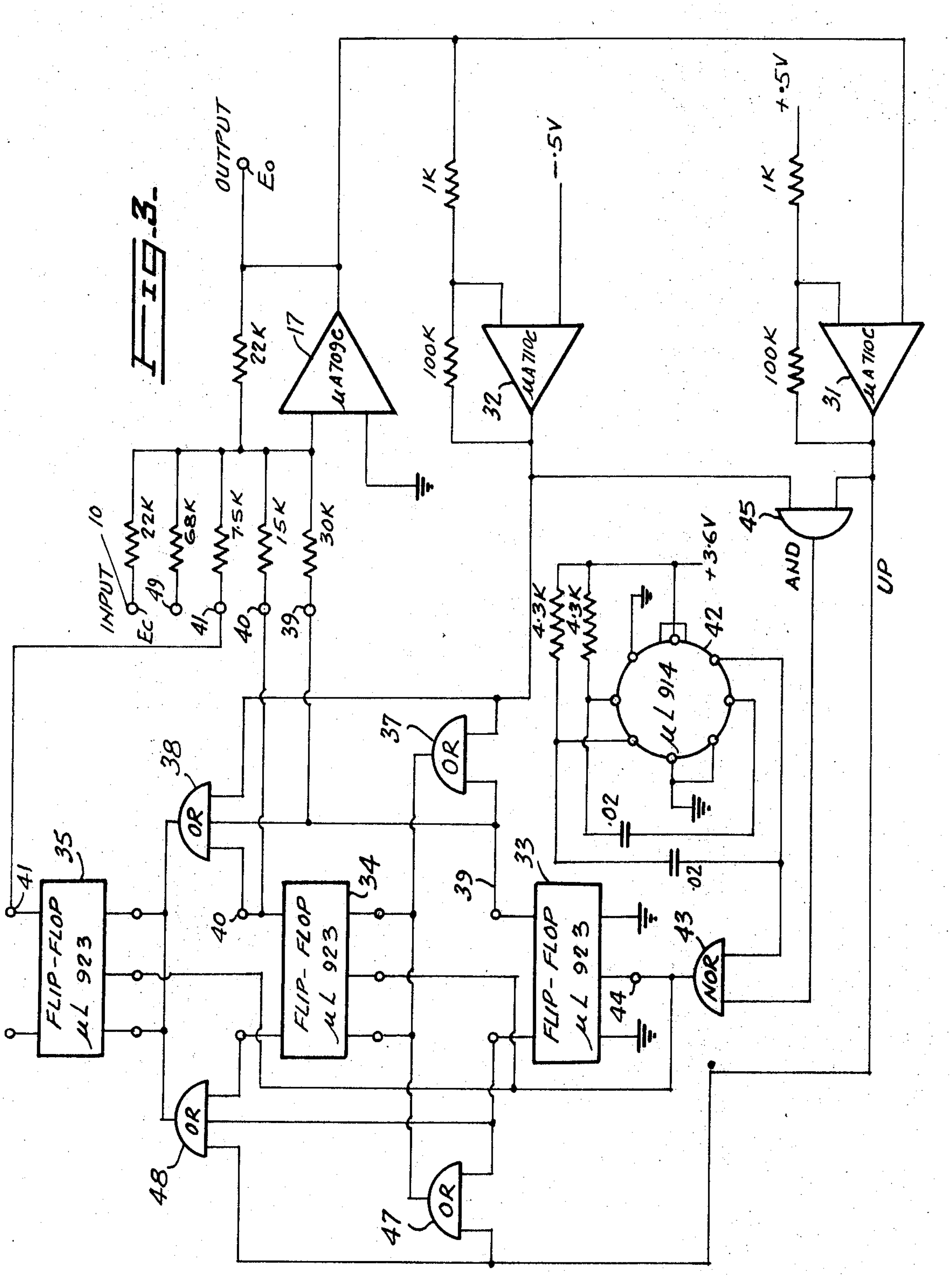

A full understanding of the construction and operation of embodiments of the present invention may be gained from the following description in reference to the accompanying drawings in which:

FIG. 1 is a block diagram of a voltage control circuit of the present invention, using an "Up" counter, FIG. 2 is a block diagram of a voltage control circuit in accordance with the invention utilizing positive logic, FIG. 3 is a schematic diagram of an embodiment of the present invention, and FIG. 4 is an illustration of the output of an automatic zero suppression circuit in accordance with the invention.

Referring to FIG. 1, there is shown a block diagram of a voltage control circuit in accordance with the invention. An input voltage $E_i$ is applied at terminal 10 and an output voltage $E_o$ is obtained at terminal 11. A voltage recorder of suitable form such as the voltage recorder 12 may be connected to the terminal 11. The output voltage $E_o$ is also applied to a voltage sensing switch 13 such as, for example, a comparator which may compare the output voltage $E_o$ with a voltage reference 14. The voltage sensing switch 13 gates the pulse generator 15 to provide pulses to the counter 16 whenever the voltage $E_o$ exceeds either the upper or lower limit of the predetermined range of voltage through which the voltage $E_o$ is permitted to vary. The counter 16 has a plurality of outputs which are fed to a summing amplifier 17 whose output is the output voltage $E_o$. In addition, the input voltage $E_i$ on terminal 10 is also connected to the summing amplifier 17. A further input may be provided on which a voltage $E_{ref}$ is furnished for reasons which will appear below.

The circuit of FIG. 1 uses an electronic voltage sensing device 13 to determine when the input to the recording system 12 has exceeded the allowable limits, and then operates to bring this input back within the proper range. By correct selection of components, the circuit may be made to perform this function as many times as is desired by the designer. The counter 16 produces a unit step in the output of summing amplifier 17 for each additional pulse from the pulse generator 15 which is counted by the counter 16. Conveniently, the counter 16 may be formed of a plurality of flip-flops arranged in a conventional fashion as a counter. When flip-flop number 1 of the counter changes state it produces a unit step in the output of the summing amplifier 17 and flip-flop numberr *n* of the counter 16 produces a step of size $2^{(n-1)}$ units when it changes state. The contributions of flip-flops to the input of the summing amplifier 17 are added in the output and any flip-flops in the "off" state contribute nothing to the output.

With the input voltage $E_i$ at terminal 10 equal to zero, a circuit is maintained in a stable state in the centre of its operating range by applying to the summing amplifier 17 an input $E_{ref}$ from a suitable reference supply. Changes of voltage of the input terminal 10 are reproduced at the output of summing amplifier 17 and operate the recorder in normal fashion. When the input voltage exceeds a specified limit the voltage sensing switch 13 gates the multivibrator 15 on, allowing pulses from the mutivibrator to reach the flip-flops of the counter 16. The resulting change in the combination of flip-flops which are in the on state produces a unit step in the correct sense to bring the recorder input back to the desired level. This unit step is also sufficient to cause the sensing switch 13 to close the gate barring any further pulses from the pulse generator 15 from reaching the flip-flops of the counter 16. Thus, the circuit remains in this new state with the recorder back on scale and still following changes of the input voltage. If the input to the recorder exceeds the limit again, the whole operation is repeated and the voltage $E_0$ is returned to the predetermined range.

If the counter 16 is comprised of a train of *n* binary flip-flops, the number of steps available from the circuit is $2^{n-1}$ so it is possible to get very many steps with a few additional flip-flops. A circuit presently operating successfully uses four flip-flops and provides 15 steps and in a typical circuit each of these steps had a magnitude of 0.5 volt. By an additional four flip-flops the circuit would be capable of providing 255 steps.

FIG. 2 is a schematic diagram partially in block form illustrating a form of the present invention utilizing positive logic. In this circuit the voltage sensing switch 13 of FIG. 1 is replaced by a positive level detector 31 and a negative level detector 32. A counter consisting of a string of flip-flops 33, 34 and 35 is provided. The circuit illustrated in FIG. 2 is capable of either counting up or counting down depending on which way the output voltage of the summing amplifier 17 varies. If the output voltage of the amplifier 17 reaches the lower limit of the preferred range, the negative level detector 32 will detect the output voltage $E_0$ and will provide an output on line 36 to the flip-flops 34 and 35 through the OR circuits 37 and 38 to count down. The output on line 36 also enables the AND circuit 45 which in turn enables the NOR circuit 43, permitting the output of the multivibrator 42 to pass to the clock terminals 44 of each of the flip-flops 33, 34 and 35. The resulting change of voltage input at the terminals 39, 40 and 41 brings the voltage $E_0$ back within the desired range and disables the NOR gate 43 to prevent further output from the multivibrator 42 from reaching the clock inputs 44.

In a similar way, if the output from the summing amplifier 17 exceeds the permissible upper level the positive level detector 31 will provide an output on the line 46 which is fed to the OR circuits 47 and 48 to instruct the counter to count UP and at the same time the output on the line 46 enables the AND circuit 45 and in turn the NOR circuit 43 to permit the output of the multivibrator 42 to pass to the clock terminals 44.

An input $E_r$ is provided at terminal 49 to preset the counter consisting of the flip-flops 33, 34 and 35 to the center of its operating range so that the range of inputs to the recorder is symmetrical with respect to the dynamic range of the circuit whose voltage is being controlled.

The resistors, $R_1$, $R_2$, $R_3$, $R_5$, $R_6$ and $R_o$ associated with the amplifier 17 are chosen to obtain the sum of the inputs through the amplifier. The design and selection of these resistors is conventional in the art. The flip-flops 33, 34 and 35 may, in accordance with a preferred form of the invention, be integrated circuit units such for example as those sold by the Fairchild Company under model number μL923.

While the specific operation of the counter utilized in the circuit of FIG. 2 is not essential to a complete understanding of the present invention, the following description is provided to indicate in more detail the manner in which the counter consisting of the flip-flops 33, 34 and 35 of FIG. 2 is caused to operate. As mentioned above this counter is formed of flip-flops 33, 34, and 35 together with associated OR gates 37, 38, 47 and 48, NOR gate

43, and AND gate 45. It will be noted from the above description and the drawing that it is specified that each of the flip-flops 33, 34, and 35 is formed of a μL923, which is a JK flip-flop which will obey the following truth table:

| SET | CLEAR | OUTPUT |
|---|---|---|
| | t=n | t=n+1 |
| H | H | $X^n$ |
| H | L | X |
| L | H | L |
| L | L | $\overline{X^n}$ |

This truth table appears in the data sheet for the μL923 JK flip-flop published May 1965. Further in order to simplify the description of the operation of the counter the following definitions are provided:

Logical 0—signifies a LO voltage level

Logical 1—signifies a HI voltage level

OR gate—output is 1 if *any* input is 1, otherwise output is 0

NOR gate—output is 0 of *any* input is 1, otherwise output is 1

AND gate—output is 1 only if *both* inputs are 1, otherwise output is 0

The operation of the counter portion of the circuit of FIG. 2 is as follows:

(1) In a stable state, UP and DOWN lines 36 and 46 are 1 (HI) and therefore outputs of *all* OR gates 37, 38, 47 and 49 are 1, the output of the AND gate 45 is 1 and the output of the NOR gate 43 is 0, even though clock pulses from the multivibrator 42 appear at one input of the NOR gate 43.

(2) Assume the counter is in the state such that the output at terminal 41Z=1, at the terminal 40Y=0, and at terminal 39X=0. This state is commonly denoted the 100 state for short, since the outputs can be regarded as representing the binary number 100, which is equivalent to the decimal number 4.

(3) If the negative level detector 32 is triggered by the decreasing level of the output $E_0$ of the summing amplifier 17 the DOWN line 36 becomes 0 and OR gates 37 and 38 are no longer forced to have an output of 1 caused by the DOWN line 36 itself. The output of these OR gates 37 and 38 is now determined by the state of their other input pins.

(4) Since the output at terminal 39X=0 (by assumption 2) and DOWN=0, the output of the OR gate 37 equals 0. This means that flip-flop 34 (Y) will be permitted to toggle (change state) upon receipt of a clock pulse from the multivibrator 42.

(5) Since X=0, Y=0 and DOWN=0, the output of the OR gate 38 equals 0 and the flip-flop 35Z will be permitted to toggle. (6) Fip-flop 33X is wired so that it will toggle every time a clock pulse is seen.

(7) As the DOWN line 36 became 0 the output of the AND gate became 0 simultaneously, enabling the NOR gate to pass clock pulses.

(8) The first clock pulse toggles all three flip-flops 33, 34 and 35 so that a new set of flip-flop outputs occur, namely Z=0 at termnial 41, Y=1 at terminal 40, X=1 at terminal 39 or the counter is said to be in the 011 or decimal equivalent 3 state.

(9) These new flip-flop outputs change the summing amplifier output in such a way that the negative level detector 32 returns the DOWN line 36 to 1 and AND gate 45 output to 1, preventing any further clock pulses from reaching the counter through the NOR gate 43.

(10) Should the negative level detector 32 once again be triggered by an output signal $E_0$ of the summing amplifier 17, the process will repeat. This time OR gate 37 will have inputs X=1, DOWN=0 so its output will be 1 and flip-flop 34 will not be permitted to toggle. OR gate 38 will have inputs X=1, Y=1, DOWN=0 making its output 1 and thus preventing flip-flop 35 from toggling.

(11) On arrival of the clock pulse, only flip-flop 33 toggles so the counter state changes from Z=0 at terminal 41, Y=1 at terminal 40, X=1 at terminal 39 to Z=0 at terminal 41, Y=1 at terminal 40, and X=0 at terminal 39 or binary 010 (decimal 2) and the clock is inhibited as before.

(12) Notice that each time the process described occurs, the decimal equivalent of the state of the counter is reduced by one, from 4 to 3 to 2 in the case cited, hence the term DOWN counting.

(13) A similar analysis will show that when the UP command is given (UP line=0) the OR gates 47 and 48 will determine which flip-flops may or may not toggle on arrival of the clock pulse. In this case the decimal equivalent of the state of the counter, as measured at terminals 39, 40 and 41 will increase by one on the arrival of a clock pulse. Note that in a flip-flop such as 33, if X=1 then X'=0 and vice versa.

The above description of the operation of the counter merely specifies the manner in which the counter of FIG. 2 operates. Those skilled in the art will readily perceive that other counters might be substituted for the counter illustrated in FIG. 2 without the exercise of inventive ingenuity.

FIG. 3 is a more specific form of the circuit illustrated in FIG. 2 in which typical commercial components are shown to form a complete operable device. The Fairchild Company model numbers are shown on each of the units except for the gate circuits all of which are formed from Fairchild integrated circuit μL914. The construction and operation of the circuit of FIG. 3 is the same as that of FIG. 2.

Figures 4A, 4B, 4C:
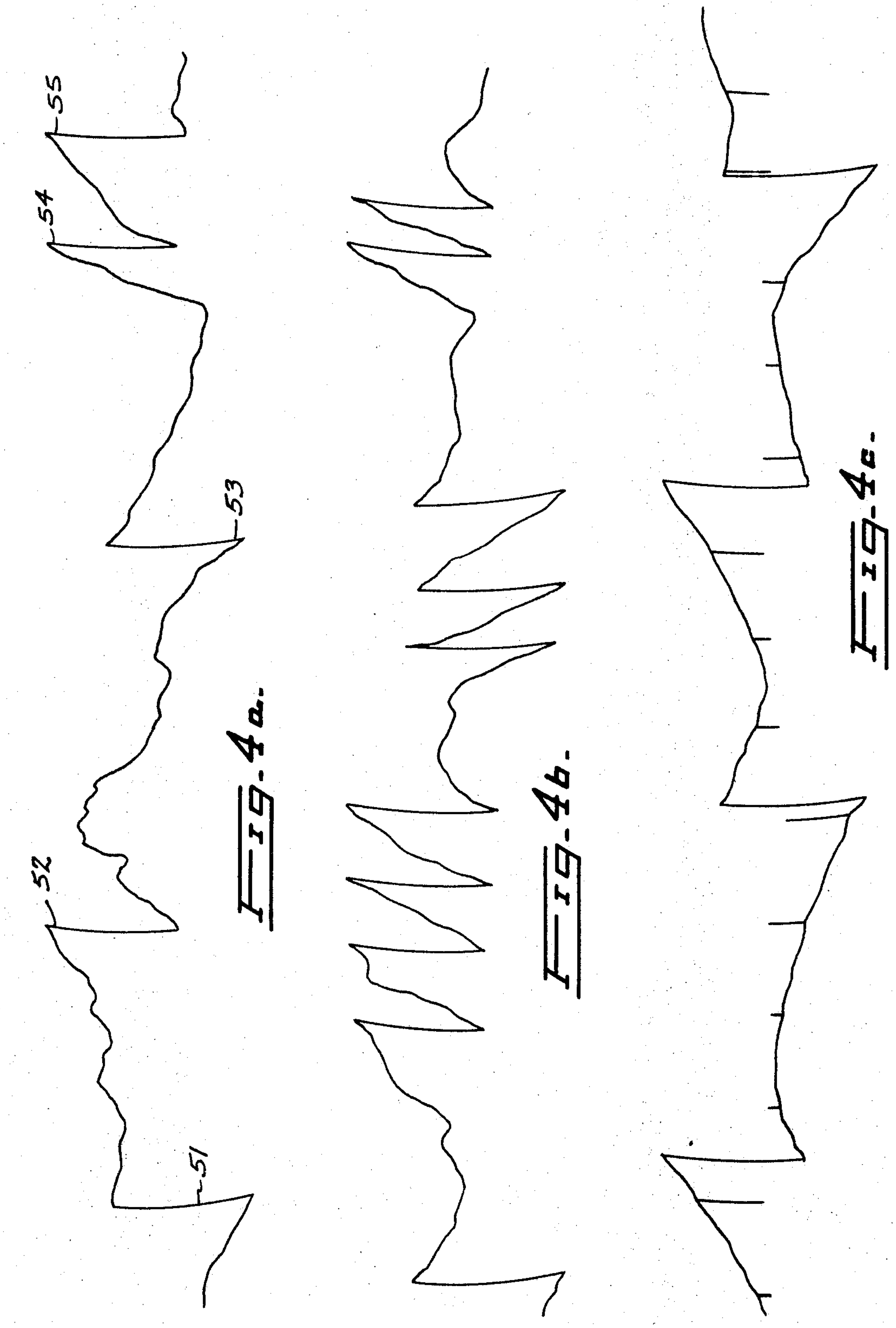

FIG. 4, *a*, *b* and *c* illustrate actual traces obtained in the Canadian Arctic utilizing a magnetometer voltage recorder. The manner in which the voltage control circuit of the present invention operates is illustrated on these traces. Referring to the trace of FIG. 4*a* it will be seen that beginning at the left hand end, the voltage being fed to the recorder is reaching the lower limit, and as the lower limit is reached, a step 51 is inserted in the trace to bring the recording back on to scale. Subsequently, as the trace moves to the right, the voltage gradually increases until at 52 a negative step is introduced into the trace. The recorder continues to record the variation in the magnetic field without change of scale. At point 53 another positive voltage step is inserted in the trace which is decreasing and subsequently at points 54 and 55 negative steps are inserted in the trace to maintain the recorder on scale. Similarly, with the traces illustrated in FIGS. 4*b* and 4*c* numerous steps have been inserted to retain the full fine grain data of the recording and at the same time to keep the recording on scale in the recorder. It will also be appreciated that anyone analysing these traces will have no difficulty in observing the desired magnetic phenomena without loss of detail despite the wide fluctuations of the magnetic field.

Thus, the voltage control circuit of the present invention provides an improved method of expanding the range of a recorder without loss of detail in the recorded data due to sensitivity changing.

I claim:

1. A voltage control circuit for maintaining a variable voltage within a predetermined range by adding predetermined discrete voltage level changes to said variable voltage, comprising a constant amplification summing amplifier having a plurality of inputs and an output, a voltage level sensing switch having its input connected to the output of said summing amplifier, a pulse generator, said voltage level sensing switch gating the output of said pulse generator, a counter having a plurality of outputs, said gated pulse generator output being fed to said counter, each of said counter outputs being fed to a different input of said summing amplifier, and said variable voltage being fed to another input of said summing amplifier, to cause the output of said summing amplifier to be the sum of the inputs to said summing amplifier, and being maintained within said predetermined range.

2. A circuit as claimed in claim 1 wherein said counter is a binary pulse counter.

3. A circuit as claimed in claim 2 wherein said counter comprises a plurality of flip-flops, an output being obtained from each flip-flop.

4. A circuit as claimed in claim 3 wherein said pulse generator is a free running multivibrator and said voltage level sensing switch opens a NOR gate to connect the output of said multivibrator to the flip-flops of said conter.

5. A voltage control circuit for maintaining a variable voltage between predetermined upper and lower levels by adding voltage steps to said variable voltage comprising a summing amplifier having a plurality of inputs and an output, a voltage level sensing switch, a pulse generator and a binary pulse counter having a plurality of outputs connected to inputs of said summing amplifier, said voltage level sensing switch being connected to the output of said summing amplifier and responsive to variations in output voltage of said summing amplifier to provide an output when the output of said summing amplifier reaches said predetermined upper and lower levels, the output of said voltage level sensing switch being connected to said pulse generator to cause pulses generated by said pulse generator to be gated to said pulse counter, said variable voltage being applied to an input of said summing amplifier, and the output voltage being maintained between said predetermined upper and lower levels.

References Cited

UNITED STATES PATENTS

| | | | |
|---|---|---|---|
| 2,836,356 | 5/1958 | Forrest et al. | 324—99XD |
| 3,187,323 | 6/1965 | Flood et al. | 324—115X |

JD MILLER, Primary Examiner

A. D. PELLINEN, Assistant Examiner

U.S. Cl. X.R.

324—99, 131